United States Patent [19] [11] 4,156,244

Erikson et al. [45] May 22, 1979

[54] INK JET PRINTER INK CARTRIDGE

[75] Inventors: Rolf B. Erikson, Lincolnwood; Edward H. Zemke, Chicago; Kenneth L. Guenther, Park Ridge, all of Ill.

[73] Assignee: Bell & Howell Company, Chicago, Ill.

[21] Appl. No.: 830,719

[22] Filed: Sep. 6, 1977

[51] Int. Cl.[2] .......... G01D 15/18
[52] U.S. Cl. .......... 346/140 R; 346/75
[58] Field of Search .......... 346/75, 140 R; 141/329-330

[56] References Cited

U.S. PATENT DOCUMENTS

| | | | |
|---|---|---|---|
| 3,482,258 | 12/1969 | Steen | 346/140 R |
| 3,688,399 | 9/1972 | Mengel | 141/329 |
| 3,708,798 | 1/1973 | Hildenbrand et al. | 346/140 R |
| 4,053,902 | 10/1977 | Skafvenstedt et al. | 346/140 R |
| 4,074,284 | 2/1978 | Dexter et al. | 346/140 R |

*Primary Examiner*—George H. Miller, Jr.
*Attorney, Agent, or Firm*—Alan B. Samlan; Harry G. Thibault

[57] ABSTRACT

An ink cartridge comprises a box containing a plastic bag or bladder which is manufactured, filled and sealed in the controlled environment of a factory. As manufactured, the bladder has almost no chance of any substantial amount of air being entrapped therein. It has no openings, except for a small fill opening which is sealed immediately after the bladder is filled with ink. The bladder has rounded contours to prevent entrapment of gas and foreign substances. A plastic tube is welded to the outside of the bladder so that it may be penetrated and the bladder may be cleanly punctured within the tube in order to introduce the ink into the machine without simultaneously introducing air or other foreign matter into the ink. A special follower arrangement feeds a piercing tool into the plastic tube without buckling or kinking it.

8 Claims, 7 Drawing Figures

INK JET PRINTER INK CARTRIDGE

This invention relates to fluid containers and more particularly to ink cartridges for use in printing machines and especially for use in ink jet printing machines.

The inventive device may be used in an ink jet printer of any suitable design. One suitable printer is described in a co-pending U.S. patent application Ser. No. 722,899, filed on Sept. 13, 1976 by Rolf Erikson, Edward Zemke and Kenneth Guenther, inventors, and entitled "Ink Jet Printer with Deflected Nozzles." Some of the features shown and explained herein also relate to this co-pending application.

The technology used in this particular jet printer was pioneered by Hellmuth Hertz. Some of this technology is disclosed in Mr. Hertz's following U.S. Pat. Nos. 3,416,153; 3,673,601; and 3,737,914. The technology is also described in a doctoral thesis entitled "Ink Jet Printing with Mechanically Deflected Jet Nozzles" by Rolf Erikson for the Department of Electrical Measurements, Lund Institute of Technology, Lund, Sweden. An ink jet printer head using the invention, in one embodiment, has a galvanometer (Part No. 60 72 235 EO39E) made by Siemens—Elema AB of Stockholm, Sweden.

This galvanometer has an oscillating glass tube terminated in an ink jet nozzle which traces a cyclically repetitive path above a moving paper or other media. The nozzle has an output stream of ink which is spontaneously broken into a spray of fine droplets which can be modulated or controlled responsive to electrical signals. These fine droplets follow each other, single file, toward a medium, such as a paper, magazine, or the like. The spray stream can be switched or deflected between two paths, so that there is an on-off modulation of the ink stream to form alpha-numerical characters on a moving paper target.

The diameter of the glass tube and nozzle may be in the order of 0.007 to 0.030 mm. Translating these dimensions into graphical terms, the outside diameter of the glass tube is approximately the size of a hair or bristle with an inside passage extending axially down the center thereof. Hence, the ink must flow through a very tiny passageway under a precise and constant pressure.

The ink droplets are deposited on the paper in a mosaic pattern, wherein a character (such as a typewritten size character, for example) may have any convenient number (such as 35–625) of matrix cells. The ink is selectively deposited in predetermined ones of the matrix cells in computer-controlled patterns which correspond to alpha-numerical symbols or the like. By present standards, a slow ink jet character formation may be completed in the order of 100 characters, per second. A fast character formation may be many times per second faster than that speed.

The foregoing information may be summarized by noting that a system for delivering ink to an ink jet printer has extremely demanding, technically accurate, and unforgiving characteristics. The character formation may be ruined by a flake of dirt, unwanted pulsation of fluid pressure or other variation. Even worse, a clogged glass tube or nozzle might cause a catastrophic system failure.

Accordingly, an object of this invention is to provide a fluid supply system, which may be closely regulated and controlled. Another object is to provide an ink supply for an ink jet printer of the above-described type.

Yet another object of the invention is to provide new and improved, contamination-free convenience systems for loading a fluid supply into a fluid-using machine. Here, an object is to provide a system which may deliver fluids without danger of introducing contaminants at the point of use. In particular, an object is to provide an ink supply system which is easy to use, easy to load, and easy to unload, without an undue danger of spilling or dropping.

Another object is to provide a container which holds and stores ink without danger of introducing air, particles, or other contaminants. A further object is to provide a container which automatically expels all air and gas, and tends to repel contaminants, while it is being filled.

In keeping with an aspect of the invention, these and other objects are accomplished by providing a box containing a bladder made of two sheets of plastic material, welded together around the edges. As manufactured, the bladder has almost no air therein and only one opening for filling, which opening is sealed immediately after the bladder is filled with ink. The bladder has rounder shoulders which cause air to rise and escape through the fill opening and thereby preclude any entrapment of air. A plastic tube is welded to the outside of the bladder so that the tube may be penetrated and the bladder may be punctured to introduce the ink into the machine without simultaneously introducing air or foreign matter into the ink. To guide a tool into the tube, there is a funnel-shaped coupler containing a spring-loaded follower which keeps the plastic tube from kinking.

The nature of a preferred embodiment may be understood from the attached drawings wherein.

Figure 1:
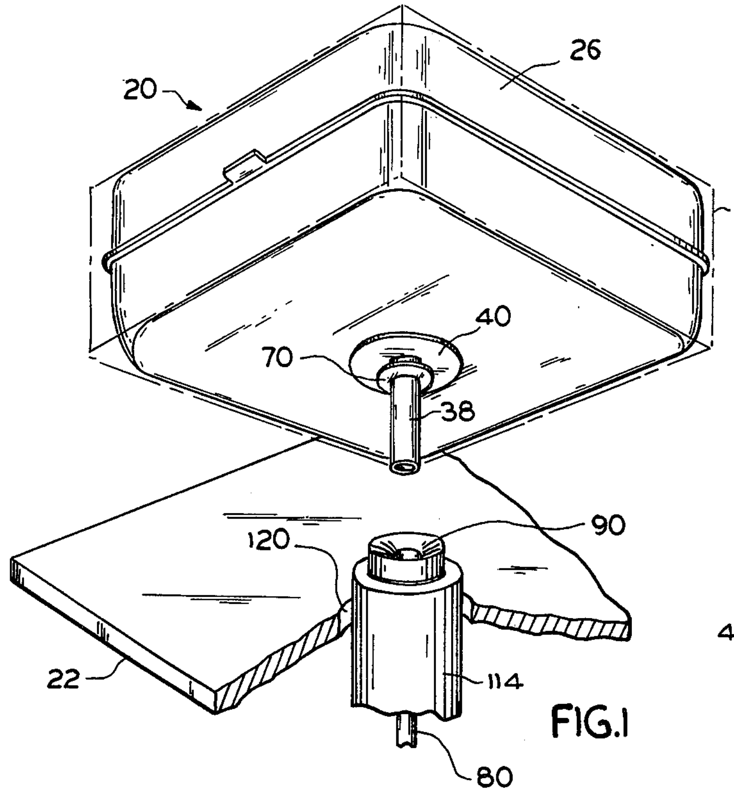
FIG. 1 is a perspective view of the inventive cartridge.
Figure 2:
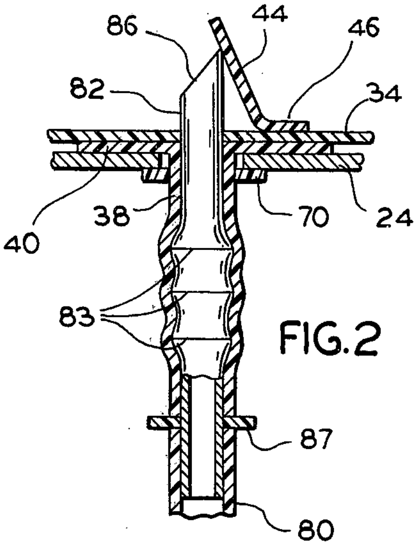
FIG. 2 is a cross-sectional representation of a connection between the ink cartridge and an ink jet printing machine.
Figure 3:
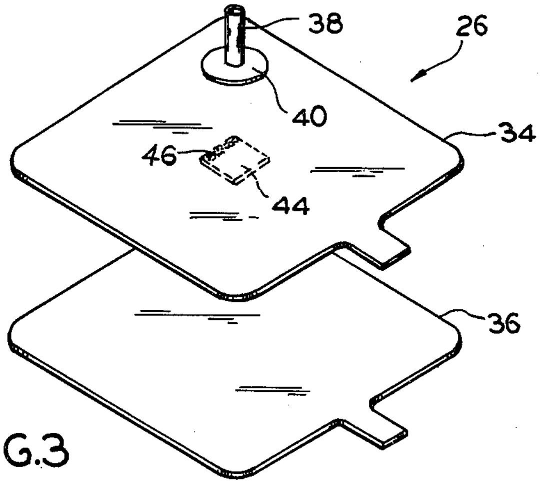
FIG. 3 is a plan view of two plastic blanks or sheets which may be put together to form the inventive plastic bladder.
Figure 4:
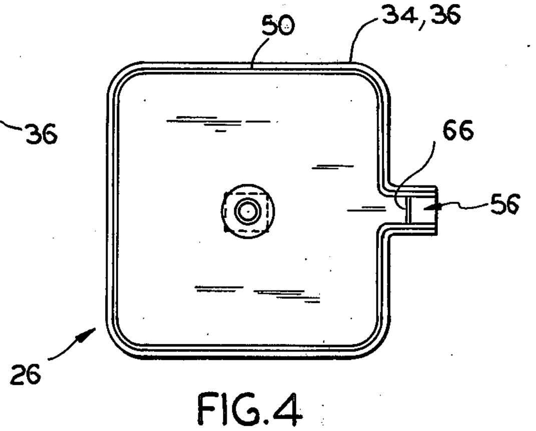
FIG. 4 shows the two blanks of FIG. 3, aligned and welded together.

An ink cartridge 20 (FIG. 1) is shown as resting (before installation) above a shelf 22 of a machine for using the ink cartridge. The cartridge comprises a box 24 containing a plastic bladder 26. The bladder 26 is made from two blanks 34,36 (FIG. 3) which are preferably die-cut from a sheet of plastic. An upstanding collar or tube 38 of plastic or elastic material is welded to one side of plastic sheet 34. A suitable ring or washer 40 of the plastic is welded over the end of collar or tube 38 and to the blank 34 to form a more reliable leak-proof seal. A small square flap 44 of similar material is placed on the other side of the plastic sheet blank 34, and opposite the collar or tube 38. One edge 46 of flap 44 is welded to the blank 34. Next, blank 34 is placed over blank 36 (FIG. 4) and then the periphery of the blanks is welded together, as shown at 50. This welding forms a completed flask-shaped cartridge 26 with an open neck at 56.

Figure 6:
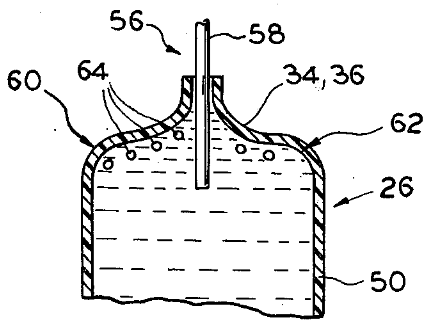
FIG. 6 shows the filling process and helps explain how gas escapes and how the ink is freed from contaminants.
Figure 5:
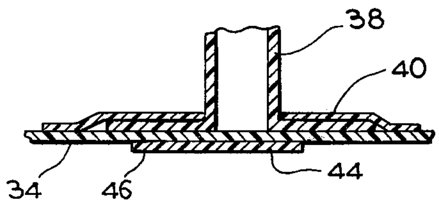
FIG. 5 is a fragmentary cross section which shows a section of the bladder after it is formed with a tube welded on one side and a flap valve welded on the other side.

A full charge or supply of ink is inserted through neck 56 and into the flask-shaped cartridge, by any suitable means 58 (FIG. 6). More particularly, during manufacture, the cartridge 26 is made from two blanks 34,36 which lie directly on top of one another so that almost no air can be present between them. Also, manufacture is carried out in a clean environment and care is taken to be sure that no dirt or other foreign substance reaches the inner surfaces of either blank before they are welded together. To fill the cartridge with ink, a tube 58 is inserted into opening 56 while the bladder 26 is held in a vertical position, as drawn in FIG. 6. Ink runs through tube 58 and into the cartridge 26, thereby displacing any small amount of air which may be therein. The shoulders 60,62 of the bladder are curved in a manner whereby seam 50 is always rising. This way, there are no pockets, corners, or other space which may entrap air. Therefore, any gas bubbles 64 move upwardly and out the top 56 of the cartridge. Then, the neck 56 is welded shut at 66, after the bladder 26 is completely filled with ink.

At any convenient time, the bladder 26 is placed inside box 24 and the tube or collar 38 is projected outwardly through a hole in the box. For example, it may be most convenient to place the bladder 26 inside the box 24 before it is filled with ink. Then, the box 24 is set on its end so that the neck 56 is directed upwardly and the ink is inserted into the bladder. Thereafter, any suitable flaps (not shown) on the end of box 24 are closed and sealed.

The tube or collar 38 is held in place against the surface of the box 24 by any suitable fastener means such as a washer 70 which slips on over the tube 38. Washer 70 may be held in place by any suitable means, such as friction or welding. In any event, the fastener means 70 prevents the tube or collar 38 from slipping into the box and also prevents any ink conduit inserted through tube 38 from bottoming on the bladder. Hence, the tube or collar 38 is held securely in a position which is almost, if not completely, perpendicular to the surface of the box.

The machine including shelf 22 may be any suitable device, such as an ink jet printer, which has any suitable receptacle (not shown) for securely receiving the cartridge. The machine using the ink cartridge also includes a flexible hose 80, which may be made from a plastic material. Attached to the end of the hose 80 is a preferably metal tube 82 (such as a stainless steel tube), having an external diameter which is slightly greater than the interior diameter of the tube 38 welded on to the surface of the plastic bladder. Therefore, the tube 38 is stretched slightly as it slips over the rigid tube 82. A plurality of annular ribs 83 are externally formed on the rigid tube 82 so that an improved seal is formed responsive to a stretching of the flexible tube 38 over the rigid tube 82. For easy installation, it may be convenient to polish the crests of the ribs to provide an extremely smooth and friction-free surface.

The tip 86 of rigid tube 82 is cut off at an angle or otherwise sharpened to form a suitable point or cutting edge for piercing the bladder. Upon such piercing, the small square flap 44 is pushed into the bladder so that the ink inside the bladder 26 may be withdrawn through tubes 80,82.

To facilitate loading, the shelf 22 of the machine using the cartridge includes a spring-loaded, funnel-shaped guide 90. The spring 116 normally urges the funnel 90 upwardly to the position seen in FIG. 1.

Figure 7:
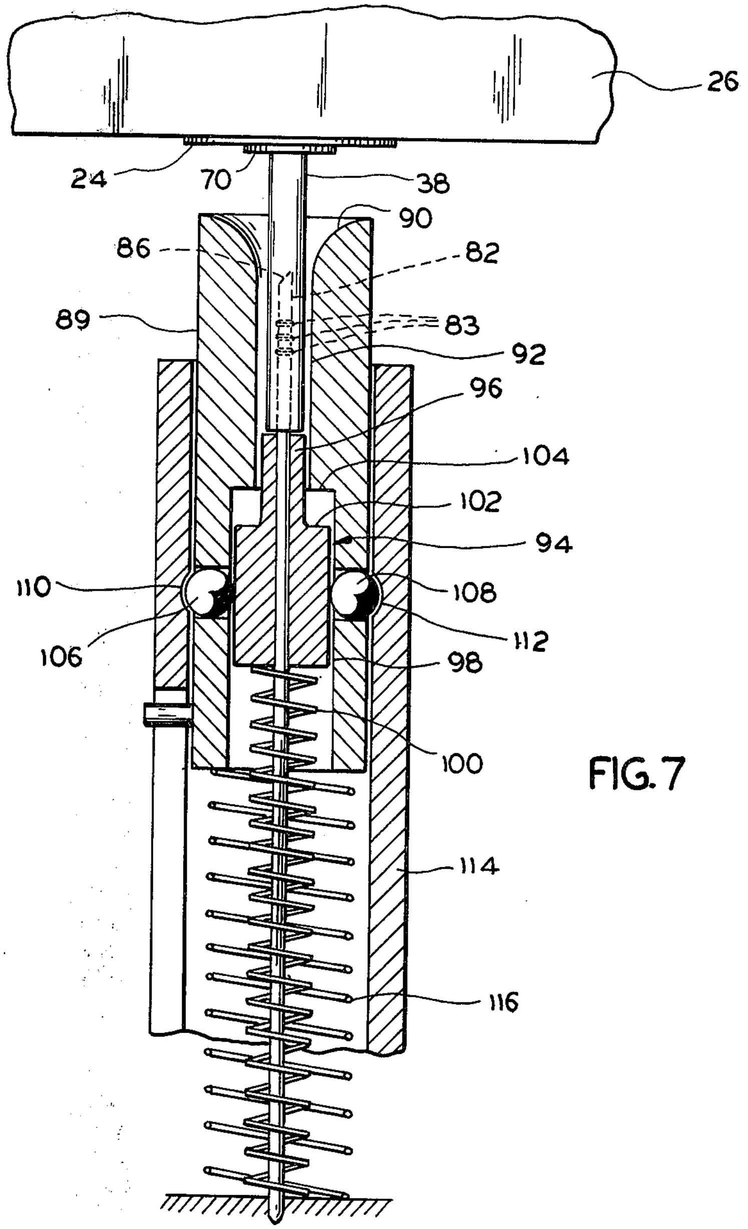
FIG. 7 is a cross-sectional view which shows a funnel guide and tube follower for guiding and directing a plastic tube over a piercing member.

FIG. 7 shows a structural tube 89 terminating in a funnel-shaped guide and containing a tube follower. This assembly provides means for guiding and directing the piercing tube into the plastic or elastic tube 38, while preventing the plastic tube from buckling, kinking, or being itself pierced because of a misalignment between the elastic and piercing tubes.

In greater detail, this tube 89 includes a funnel-shaped opening 90 leading into a passageway 92 which is only slightly greater in inside diameter than the outside diameter of the plastic tube 38. Therefore, the plastic tube 38 is guided over the piercing tube as it slides into and through the passageway 92. Nevertheless, unless a suitable restraint is provided, it would still be possible for the plastic tube to twist or buckle as it passes through the passageway 92, in which case, the piercing tube might damage or destroy the elastic tube.

Follower means 94 is a cylinder with a central coaxial bore. An upper and generally smaller cylindrical section 96 has an outside contour which slides smoothly through the passage 92. Beneath the upper cylindrical section 96, the follower has a lower and enlarged section which slides smoothly in a bore 98 which is larger than the bore 92. Before the plastic tube 38 is inserted into the tube 92, a spring 100 urges the follower 94 upwardly until a shoulder 102 on the follower abuts against a mating shoulder 104 within the structural tube 89.

In this position, the follower 94 forces two ball detents 106,108 outwardly and into mating dimples 110 and 112 in an outer structural tube 114. As long as the ball detents are locked in these positions, it is impossible for the tube 89 to telescope into the tube 114. A second spring 116 normally urges the inner tube 89 upwardly and into its locked position.

When the end of plastic tube 38 is inserted into the funnel 90, its slanting sides guide the tip of plastic tube 38 toward the piercing metal tip 86. The piercing tip 86 enters the lower end of the elastic or plastic tube 38. Then, the lower end of tube 38 begins to bear against and push downwardly upon the follower 94. However, if the elastic or plastic tube 38 should become bent, twisted, kinked, or otherwise misaligned, the tube end does not properly engage the follower 94 so that it does not move downwardly. Therefore, ball detents 106,108 hold a lock on the two telescoping tubes 89,114. It is not possible to continue with the cartridge-loading procedure.

If the structural tubes 89,114 were not so locked, the piercing tip 86 might be broken or the walls of the tube 38 might themselves be pierced. Assuming that the elastic or plastic tube 38 is loaded so that the piercing tip 86 properly enters it, the follower 94 is pushed downwardly. When the shoulders 102 pass the ball detents 106,108, they may move inwardly and out of the dimples 110,112. This enables the tube 89 to telescope into the tube 114.

As the bottom wall of box 24 comes into contact with the top of the funnel 90, it is pushed downwardly against the bias of spring 116. The spacing between the stem of funnel 90 and piercing tube 82 is such that the elastic plastic tube 38 must stretch in a desired manner over the piercing tube 82 for the telescoping of tubes 98,114 to continue. A continued downward pressure upon the cartridge causes the funnel to move against the bias of spring 116 and to submerge into hole 120 and below the top of the tube 114.

When the cartridge 20 is lifted off shelf 22, the elastic tube 38 is pulled away from the piercing tube 82. The springs 100,116 force tube 89, with its funnel 90, to move upwardly. The system is now ready to load the next cartridge.

It should now be clear that the ink cartridge may be manufactured and filled under clean and controlled conditions. The cartridge is shaped and oriented during filling so that all gas will automatically float out of the cartridge. Then, the cartridge is sealed, while still in the clean and controlled environment. Until use, the tube 38 may be capped to keep out all foreign material, if desired.

At the time of usage, the installer slips the rigid piercing tube into the flexible tube 38, thereby sealing together the members 38,82. Before it can pierce the plastic material of the ink bladder, the tip end 86 will already have been captured within the clean environment in the interior of the tube 38.

Normally, the hose 80 and the rigid tube 82 are full of ink at the time when an old cartridge is removed and a new cartridge is installed. Thus, there will be very little chance for any substantial amount of gas to be entrapped at the connection. If there is any such entrapped air, it floats upwardly into the rigid tube 82 and is immediately drawn off. Nevertheless, a gas trap (which is a known device) is also supplied in the line 80. Finally, the cartridge-loading procedures may be designed to draw off any initial bubble of air before the ink jet printer is returned to operation.

Those who are skilled in the art will readily perceive how to modify the system. Therefore, the appended claims are to be construed to cover all equivalent structures.

We claim:

1. A fluid supply cartridge system for use in a machine having a flexible fluid-conveying tube with a rigid piercing tube attached to an end thereof for the introduction of said fluid into said machine, said cartridge comprising a box containing a sealed flexible bladder having an elastic tube integrally formed to one side thereof, said elastic tube projecting through an opening in said box, means to guide and direct said elastic tube into an aligned position over said rigid piercing tube, and the inside diameter of said elastic tube being slightly smaller than the outside diameter of said rigid piercing tube, whereby the fluid inside the cartridge may be introduced into said machine by stretching said elastic tube over said rigid tube which pierces said bladder at a point inside said elastic tube, and a fluid tight seal is effectuated between said rigid tube and said elastic tube.

2. The cartridge system of claim 1 wherein said bladder comprises a generally flask-shaped bag having a fill opening at one end thereof, all sides of said bladder leading toward said fill opening extending upwardly with rounded shoulders when said bladder is in a filling position, whereby there are no corners or other collection points for entrapping gas or other foreign substance during a filling sequence.

3. The cartridge system of claim 1 and flap valve means inside said bladder and beneath said point where said rigid tube pierces said bladder, said flap valve closing said point of piercing when said rigid tube is removed from said elastic tube.

4. The cartridge system of claim 3 and a plurality of annular ridges circumferentially formed on the outside walls of said rigid tube to assist in sealing the elastic tube to said rigid tube.

5. The cartridge system of claim 1 wherein said rigid tube is coaxially located within at least one structural tube having a generally funnel-shaped opening for receiving an end of said elastic tube, said funnel guiding and directing said elastic tube into an aligned position over said rigid tube.

6. The cartridge system of claim 5 wherein said structural tube comprises a telescoping pair of tubes normally locked together in an extended position, with a tip on said piercing tube positioned at a location which is recessed within said locked structural telescoping tubes, means responsive to a properly aligned seating of said elastic tube over a tip of said piercing tube for unlocking said telescoping tubes, and means responsive to the unlocking of said telescoping tubes and enabling said piercing tube to reach and pierce said bladder.

7. The cartridge system of claim 6 wherein said means for unlocking said telescoping tubes comprise a pair of ball detents and a follower for said elastic tube which holds said detents in a locking position, and means responsive to a proper seating of said elastic tube over said piercing tube for moving said follower and releasing said ball detents.

8. An ink supply cartridge system for use in an ink jet printing machine having an ink-conveying tube terminating in a rigid tube with a piercing end, said ink-conveying tube introducing ink from said cartridge into said ink jet printing machine, said cartridge comprising a box containing a flexible, sealed bladder having a generally flask-shaped bag with a fill opening at one end, all sides of said bladder leading toward said fill opening extending upwardly with rounded shoulders when said bladder is in a filling position, whereby there are no corners or collection points for entrapping gas during a filling sequence, an elastic tube means welded to an unbroken wall on one side of said bladder, means for projecting said elastic tube through and securing it in an opening in the top of said box, funnel means to guide and direct said elastic tube into an aligned position over said rigid piercing tube, the inside diameter of said elastic tube being slightly smaller than the outside diameter of said rigid tube, a plurality of annular ridges circumferentially formed on the outside walls of said rigid tube to assist in sealing the elastic tube to said rigid tube, said rigid tube terminating in said piercing tip which pierces said bladder at a point inside said elastic tube, and a pair of normally locked telescoping tubes which must telescope in order for said piercing tip to pass through said elastic tube and reach said bladder, and ball detent means responsive to a proper seating of said elastic tube over said rigid piercing tube for unlocking said pair of telescoping tubes.

* * * * *